United States Patent
Hisamoto

(10) Patent No.: US 7,689,306 B2
(45) Date of Patent: Mar. 30, 2010

(54) AUDIO PLAYER AND METHOD FOR PLAYING AUDIO DATA

(75) Inventor: Koji Hisamoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 944 days.

(21) Appl. No.: 11/476,555

(22) Filed: Jun. 29, 2006

(65) Prior Publication Data

US 2007/0073931 A1    Mar. 29, 2007

(30) Foreign Application Priority Data

Jun. 29, 2005  (JP)  ............................. 2005-189672

(51) Int. Cl.
*G06F 17/00*   (2006.01)
(52) U.S. Cl. ........................................................ 700/94
(58) Field of Classification Search .................. 700/94; 714/746, 747

See application file for complete search history.

(56) References Cited

U.S. PATENT DOCUMENTS 5,732,356 A    3/1998    Bolt

FOREIGN PATENT DOCUMENTS

JP    9-27757    1/1997

*Primary Examiner*—Andrew C Flanders
(74) *Attorney, Agent, or Firm*—Oblon, Spivak, McClelland, Maier & Neustadt, L.L.P.

(57) ABSTRACT

An audio player includes: a buffer unit that temporary stores sampling values contained in a second-half frame of each of a plurality of frames received in time series, the frames containing audio data; a detecting unit that detects a defect in the frames; an inverted-frame generating unit that generates a first-half inverted frame containing first-half complementarity samples obtained by arranging the sampling values of the second-half frame of a normal frame in a reverse order of the time series, the normal frame being received immediately before the defect is detected; a non-inverted frame generating unit that generates a second-half non-inverted frame containing second-half complementarity samples obtained by arranging the sampling values of the second-half frame of the normal frame in the time series; and an output unit that outputs the normal frame, the first-half inverted frame, and the second-half non-inverted frame, in this order.

6 Claims, 8 Drawing Sheets

AUDIO PLAYER AND METHOD FOR PLAYING AUDIO DATA

RELATED APPLICATION(S)

The present disclosure relates to the subject matter contained in Japanese Patent Application No. 2005-189672 filed on Jun. 29, 2005, which is incorporated herein by reference in its entirety.

FIELD

The present invention relates to an audio player and method for reproducing digital audio data.

BACKGROUND

In recent years, a large amount of digital data including audio data and video data has been used for digital communication. Therefore, the audio data and the video data need to be transmitted in the form of compressed digital data. The audio data is called a compressed digital audio stream. When the audio data is received, it is separated from the video data. Then, the audio data is decompressed and decoded and is then converted into analog data. In this way, the audio data can be played as a sound.

When the compressed digital audio stream is an MPEG (Moving Picture Expert Group) audio having a sampling frequency of 48 kHz, it is separated from the video data and is then decoded. Then, the compressed digital audio stream is converted into a frame having plurality of PCM (Pulse Coded Modulation) data corresponding to a time of 24 ms. When defect occurs in the compressed digital audio stream, such as when audio data in the compressed digital audio stream is not duly received, the PCM data could not be generated, which causes a defect in a frame, such as the omission of the frame including the PCM data.

In this case, a method of generating a frame composed of PCM data having a level of zero is used to complement the defect in a frame. However, in this method, reproduced audio data varies discontinuously, which causes a sound noise, such as a pop sound or a click sound. As a result, sound quality deteriorates. In order to solve this problem, a method of using a filter to convert the discontinuous audio data into audio data having smooth audio waveform has been disclosed. However, since this method causes an increase in the amount of computing data, the method is not practical. As another solution, a method of complementing an omitted frame with the frame recorded immediately before the omission occurs has been proposed (for example, see JP-A-9-027757 (U.S. Pat. No. 5,732,736)).

SUMMARY

According to a first aspect of the invention, there is provided an audio player including: a buffer unit that temporary stores sampling values contained in a second-half frame of each of a plurality of frames received in time series, the frames containing audio data sampled in a predetermined sampling rate; a detecting unit that detects a defect in the frames; an inverted-frame generating unit that generates a first-half inverted frame containing first-half complementarity samples that are obtained by arranging the sampling values of the second-half frame of a normal frame in a reverse order of the time series, the normal frame being received immediately before the defect is detected by the detecting unit; a non-inverted frame generating unit that generates a second-half non-inverted frame containing second-half complementarity samples that are obtained by arranging the sampling values of the second-half frame of the normal frame in the time series; and an output unit that outputs the normal frame, the first-half inverted frame, and the second-half non-inverted frame, in this order.

According to a second aspect of the invention, there is provided a method for playing an audio data, the method including: receiving a plurality of frames, in time series, containing the audio data sampled in a predetermined sampling rate; temporary storing sampling values contained in a second-half frame of each of the frames; detecting a defect in the frames; generating a first-half inverted frame containing first-half complementarity samples that are obtained by arranging the sampling values of the second-half frame of a normal frame in a reverse order of the time series, the normal frame being received immediately before the defect is detected; generating a second-half non-inverted frame containing second-half complementarity samples that are obtained by arranging the sampling values of the second-half frame of the normal frame in the time series; and outputting the normal frame, the first-half inverted frame, and the second-half non-inverted frame, in this order.

DETAILED DESCRIPTION OF THE EMBODIMENT(S)

Figure 1:
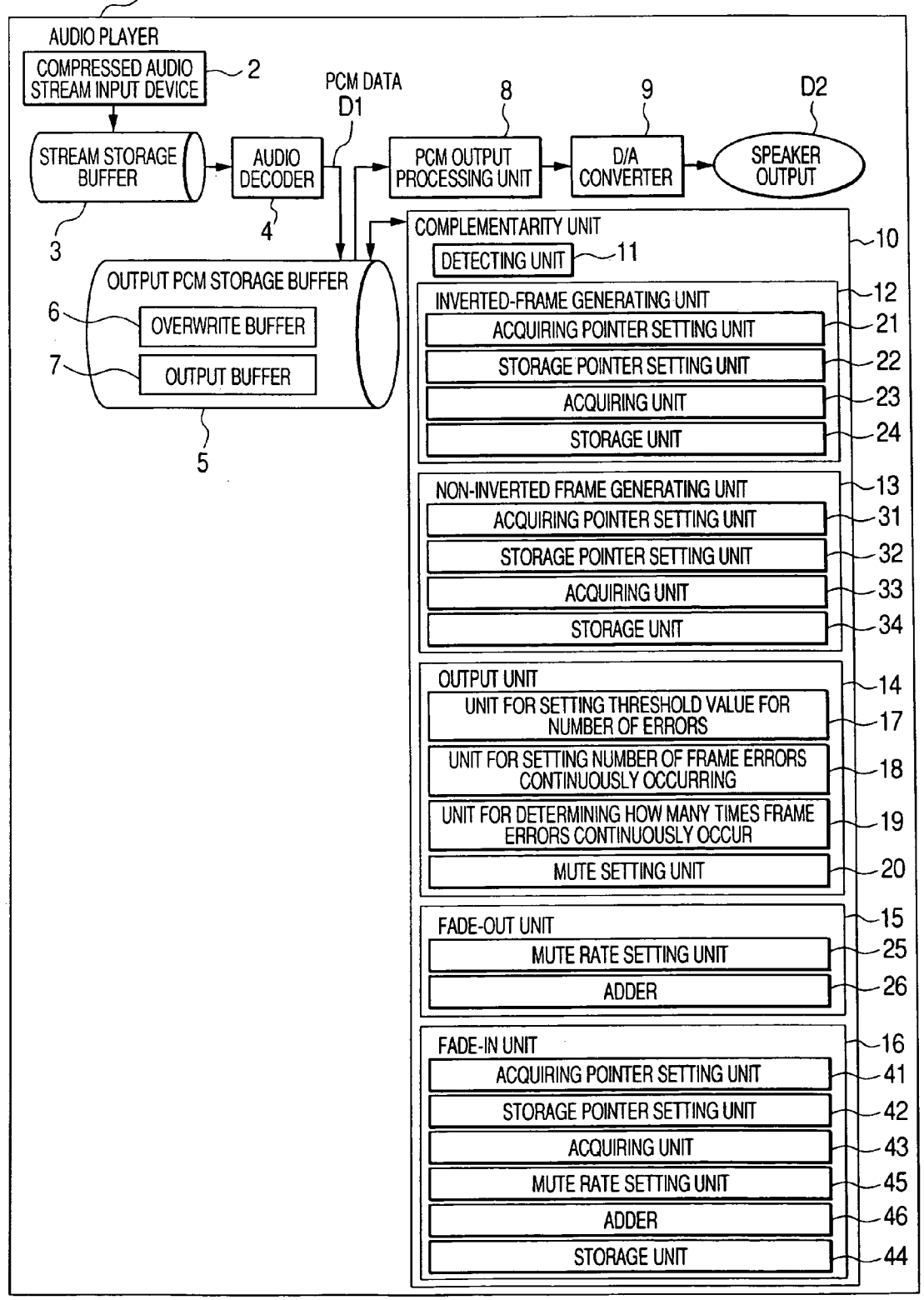
FIG. 1 is a diagram illustrating a configuration of an audio player according to an embodiment.

Hereinafter, an embodiment of the invention will be described with reference to the accompanying drawings. Although the embodiment is described below with reference to the drawings, the invention is not limited to the drawings. In the drawings, the same or similar components are shown by the same reference numerals. The drawings are illustrative, and the relationship between time and dimensions in plan view and the ratio of each time component may be different from the actual relationship and ratio.

As shown in FIG. 1, an audio player 1 according to an embodiment includes: a compressed audio stream input device 2; a stream storage buffer 3; an audio decoder 4; an output PCM storage buffer 5; a PCM output processing unit 8; a digital-to-analog (D/A) converter 9; and a complementarity unit 10.

The compressed audio stream input device 2 separates compressed audio data multiplexed with an video data signal from video data as a compressed digital audio stream, in digital broadcasting or a storage medium, such as a hard disk drive (HDD) or a digital versatile disc (DVD), and inputs the compressed digital audio stream.

The stream storage buffer 3 stores and temporary retains the input compressed digital audio stream.

The audio decoder 4 inputs the compressed digital audio stream from the stream storage buffer 3 in the format of audio data, which is called an elementary stream (ES). The audio decoder 4 decompresses and decodes ES to generate PCM audio data D1. For example, in an MPEG audio having a sampling frequency of 48 kHz, ES is converted into a plurality of samples of the PCM audio data D1 corresponding to an audio wave form having a frame time of 24 ms. A cluster of the plurality of samples of the PCM audio data D1 converted every frame time is called a frame. In the frame, the plurality of samples of the PCM audio data D1 are arranged in time series. From the continuity of audio waveforms, the audio decoder 4 needs to receive a plurality of frames in time series and to completely decode every frame within a frame time of 24 ms. The audio decoder 4 may generate and hold intermediate data at the same time when it decodes the previous frame and may use the intermediate data to decode the next frame such that the audio waveforms are smoothly connected between the frames, thereby generating a plurality of samples of the PCM audio data D1.

The output PCM storage buffer 5 (buffer unit) temporary stores the generated plurality of samples of the PCM audio data D1. The output PCM storage buffer 5 includes an overwrite buffer 6 and an output buffer 7. The overwrite buffer 6 repeatedly overwrites in time series the second-half frames of the plurality of frames received in time series. The output buffer 7 stores the PCM audio data D1 that has been complemented and generated and outputs the PCM audio data D1 to the PCM output processing unit 8.

The PCM output processing unit 8 adjusts an audio volume of the PCM audio data D1 and also performs filtering or three-dimensional processing on the PCM audio data D1 to have various audio effects or a stereoscopic effect.

The D/A converter 9 converts the PCM audio data D1 into analog data to generate an audio signal D2 having an analog audio waveform. The audio signal D2 outputs from a speaker as a sound.

The complementarity unit 10 includes a detecting unit 11, an inverted-frame generating unit 12, a normal-frame generating unit 13, an output unit 14, a fade-out unit 15, and a fade-in unit 16.

The detecting unit 11 detects a defect in the frames. For example, when a failure occurs in a data sending device or a transmitting system of a broadcasting station, ES data is not normally transmitted and received by an expected decoding start time. In addition, there might be a case where an insufficient or erroneous compressed digital audio stream is input to the audio player 1. In these cases, since the audio decoder 4 could not perform decoding of the audio data properly, a normal frame that contains appropriate audio data could not be duly generated. The detecting unit 11 detects the defect (such as lacking of the normal frame) in the frames. The detecting unit 11, after detecting the defect, also detects the dissolution of the defect when the normal frames start to be received again.

The inverted-frame generating unit 12 includes an acquiring pointer setting unit 21, a storage pointer setting unit 22, an acquiring unit 23, and a storage unit 24. The inverted-frame generating unit 12 generates a first-half inverted frame having first-half complementarity samples obtained by arranging in the reverse order of time series normal samples of the second-half frame of the normal frame immediately before the detecting unit 11 detects the defect of the frame.

The non-inverted frame generating unit 13 includes an acquiring pointer setting unit 31, a storage pointer setting unit 32, an acquiring unit 33, and a storage unit 34. The non-inverted frame generating unit 13 generates a second-half non-inverted frame having second-half complementarity samples obtained by arranging in time series normal samples of the second-half frame of the normal frame immediately before the detecting unit 11 detects the defect of the frame.

The output unit 14 outputs the normal frames, the first-half inverted frames, and the second-half non-inverted frames in this order. When the detecting unit 11 detects the normal audio data after detecting the abnormal audio data, the output unit 14 outputs the normal frame that has been received after the defect of the frame is detected, next to the second-half non-inverted frame. The output unit 14 includes a unit 17 for setting a threshold value for the number of errors, a unit 18 for setting the number of frame errors continuously occurring, a unit for determining how many time the frame errors continuously occur, and a mute setting unit 20. The output unit 14 repeatedly performs an operation of alternately outputting the first-half inverted frames and the second-half non-inverted frames, and then outputs samples corresponding to mute.

The fade-out unit 15 includes a mute rate setting unit 25 and an adder 26. The fade-out unit 15 fades out the first-half complementarity samples of the first-half inverted frame and the second-half complementarity samples of the second-half non-inverted frame. In another words, the fade-out unit 15 controls the sampling values of the first-half complementarity samples contained in the fist-half inverted frame and of the second-half complementarity samples contained in the second-half non-inverted frame, to fade out an output level of the audio data.

The fade-in unit 16 includes an acquiring pointer setting unit 41, a storage pointer setting unit 42, an acquiring unit 43, a storage unit 44, a mute rate setting unit 45, and an adder 46. The fade-in unit 16 fades in a plurality of normal samples of the normal frame received after the defect of the frame is detected. In another words, the fade-in unit 16 controls the sampling values of samples contained in the normal frame to fade in an output level of the audio data.

Figure 2:
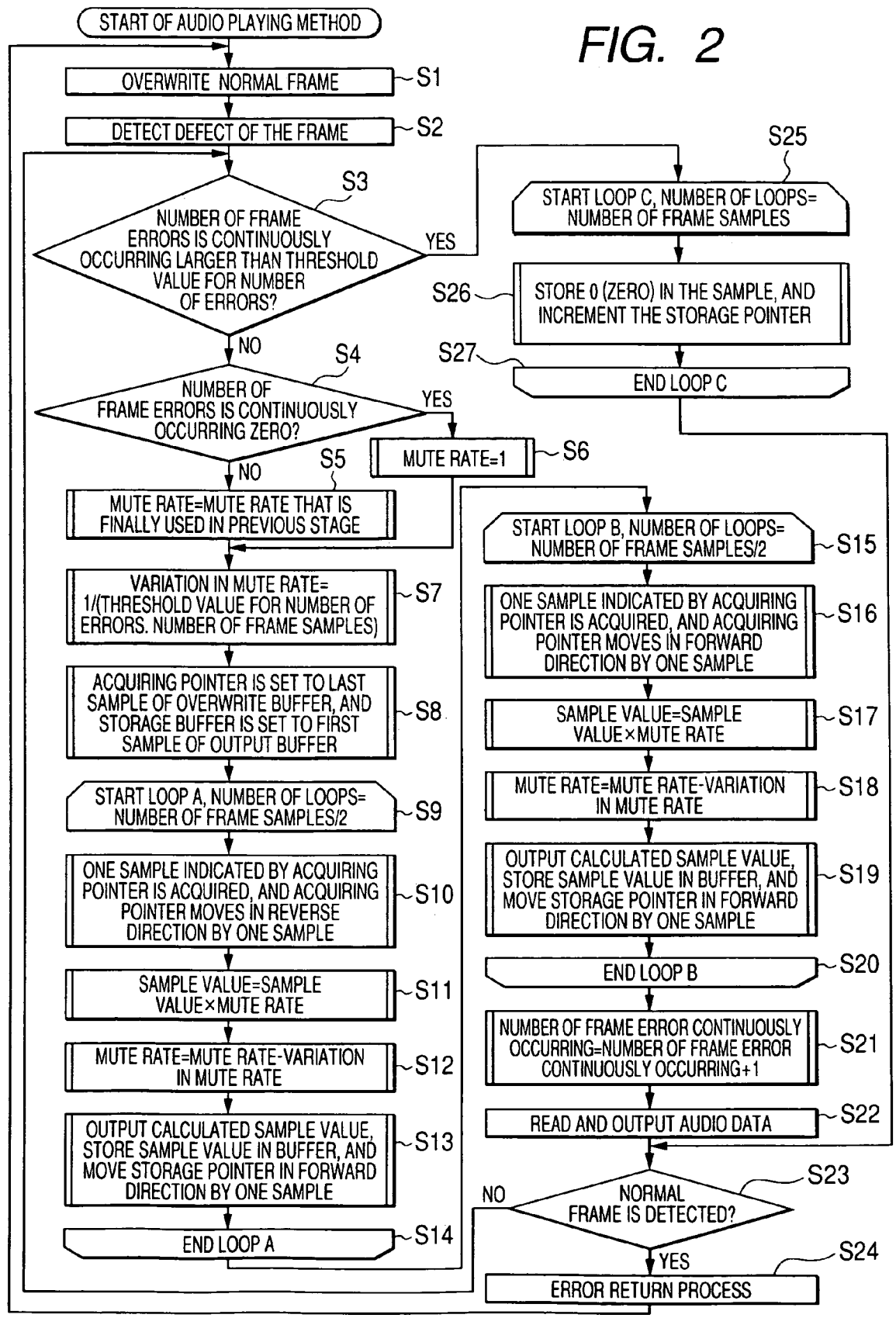
FIG. 2 is a flow chart illustrating an audio playing method according to the embodiment.
Figure 3:
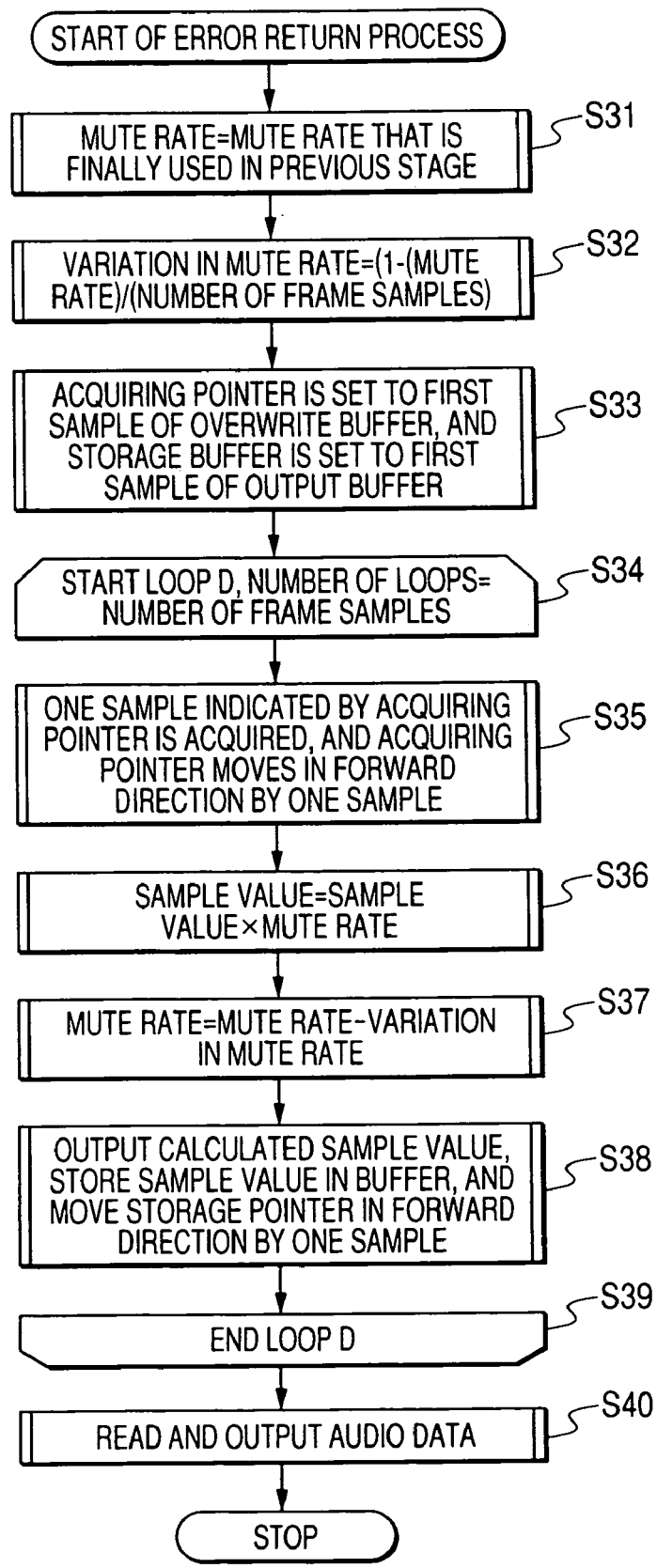
FIG. 3 is a flow chart illustrating an error return process of the audio playing method according to the embodiment.
Figure 4:
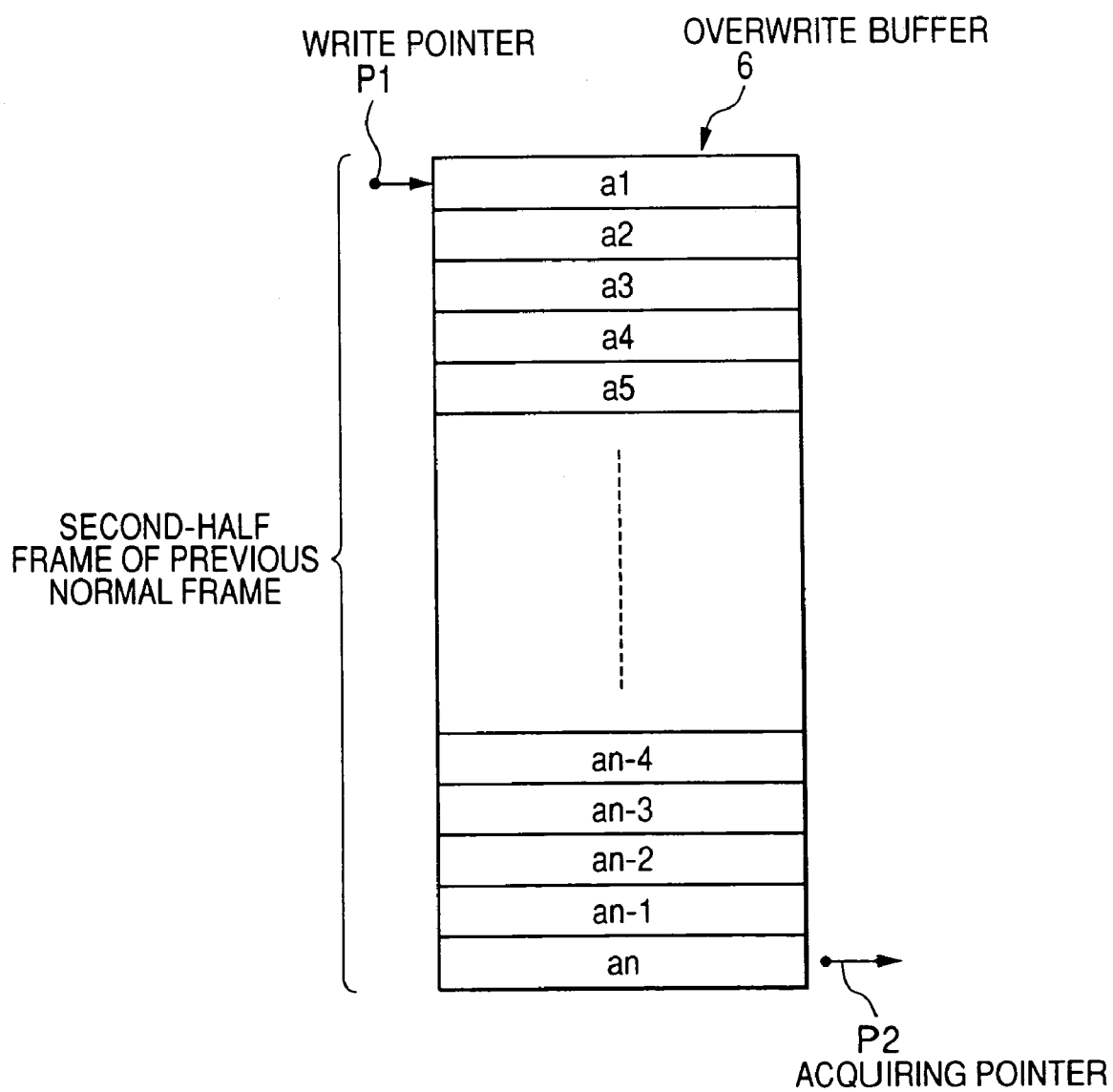
FIG. 4 is a diagram illustrating a configuration of an overwrite buffer.

An audio playing method according to another embodiment is performed by using the audio player shown in FIG. 1. As shown in FIGS. 2 and 3, in step S1, the compressed audio stream input device 2 stores a compressed digital audio stream to the stream storage buffer 3. The audio decoder 4 reads out the compressed digital audio stream from the stream storage buffer 3 and generates a normal frame. As shown in FIG. 4, the overwrite buffer 6 can store all samples "a1" to "an" of the second half of the frame. The samples "a1" to "an" are stored in time series. More specifically, a writing pointer P1 is set from the upper side to the lower side one by one, and the samples are stored in time series whenever the setting is performed. When the audio decoder 4 generates the next normal frame, the overwrite buffer 6 writes samples "a1" to "an" of the second half of the normal frame over the samples "a1" to "an" of the second half of the previous normal frame and stores the samples.

When the detecting unit 11 detects the defect of the compressed digital audio stream of audio data in step S2, in step S3, the unit 17 for setting a threshold value for the number of errors sets a threshold value for the number of errors, which is a maximum value where a continuous series of frame errors causing normal frames to be continuously generated is permitted. For example, a threshold value for the number of errors is set in the range of 1 to 100. The unit 18 for setting the number of frame errors continuously occurring sets an initial value for the number of frame errors continuously occurring to zero (0). The unit 19 for determining how many times the frame errors continuously occur determines whether the number of frame errors continuously occurring is larger than the threshold value for the number of errors. When it is determined that the number of frame errors continuously occurring is larger than the threshold value for the number of errors, the process proceeds to step S25 to generate a mute frame. On the other hand, when it is determined that the number of frame errors continuously occurring is smaller than the threshold value for the number of errors, the process proceeds to step S4 to generate a complementarity frame.

In step S4, the unit 19 for determining how many times the frame errors continuously occur determines whether the number of frame errors continuously occurring is zero. When the number of frame errors continuously occurring is zero, the process proceeds to step S6. In step S6, the mute rate setting unit 25 sets a mute rate to 1. On the other hand, when the number of frame errors continuously occurring is not zero, the process proceeds to step S5.

In step S5, the mute rate setting unit 25 sets the mute rate finally used when the defect of the previous frame is detected to a current mute rate.

In step S7, the mute rate setting unit 25 calculates a variation in the mute rate. The variation in the mute rate is obtained by dividing an initial value, 1, of the mute rate by a product of the threshold value for the number of errors and the number of frame samples.

In step S8, the acquiring pointer setting unit 21 sets an acquiring pointer P2 shown in FIG. 4 to the last sample an of the overwrite buffer 6. In addition, the storage pointer setting unit 22 sets a storage pointer P3 shown in FIG. 5 to a first storage area "b1" of the output buffer 7.

In step S9, a loop A starts. In the loop A, the inverted-frame generating unit 12 shown in FIG. 1 generates a first-half inverted frame. The loop A is composed of steps S10 to S13 between step S9 and step S14. The number of loops is half the number of frame samples, that is, n.

In step S10, the acquiring unit 23 acquires, as one sample, the sample an indicated by the acquiring pointer P2. Then, the acquiring pointer setting unit 21 moves the acquiring pointer P2 in the reverse direction by one sample to set the acquiring point to a sample "an−1".

In step S11, the adder 26 adds the mute rate to the sample value of the sample "an".

In step S12, the mute rate setting unit 25 sets a value obtained by subtracting the variation in the mute rate from the mute rate as a new mute rate.

In step S13, the storage unit 24 stores the value calculated in step S11 in the storage area "b1" of the output buffer 7 where the storage pointer P3 is set. The storage pointer setting unit 22 moves the storage pointer P3 in the forward direction by one area to set the storage pointer P3 to an area b2.

In step S14, the loop A is completed once. Then, the loop A is performed a predetermined number of times in the same manner as described above. In this way, a value obtained by multiplying the sample value of the second sample "an−1" from the bottom of the overwrite buffer 6 by a mute rate changed by the variation is stored in the second storage area "b2" of the output buffer 7. A value obtained by multiplying the sample value of the third sample "an−2" from the bottom of the overwrite buffer 6 is by a mute rate changed by the variation is stored in a third storage area "b3" of the output buffer 7. Finally, a value obtained by multiplying the sample value of the first sample "a1" from the top of the overwrite buffer 6, that is, the sample value of an n-th sample from the bottom of the overwrite buffer 6, by a mute rate changed by the variation is stored in an n-th storage area "bn" of the frame samples of the first-half frame of the output buffer 7.

In step S15, a loop B starts. In the loop B, the non-inverted frame generating unit 13 shown in FIG. 1 generates a second-half non-inverted frame. The loop B is composed of steps S16 to S19 between step S15 and step S20. The number of loops is half the number of frame samples, that is, "n".

In step S16, the acquiring unit 33 acquires, as one sample, a first sample "a1" from the top that is indicated by the acquiring pointer P2. Then, the acquiring pointer setting unit 31 moves the acquiring pointer P2 in the forward direction by one sample to set the acquiring point P2 to a sample "a2".

In step S17, the adder 26 adds the mute rate to the sample value of the sample "a1".

In step S18, the mute rate setting unit 25 sets a value obtained by subtracting a variation in the mute rate from the mute rate as a new mute rate.

In step S19, the storage unit 34 stores the value calculated in step S17 in a storage area "bn+1" set of the output buffer 7 where the storage pointer P3 is set. The storage pointer setting unit 32 moves the storage pointer P3 in the forward direction by one area to set the storage pointer P3 to an area "bn+2".

In step S20, the loop B is completed once. Then, the loop B is performed a predetermined number of times in the same manner as described above. In this way, a value obtained by multiplying the sample value of the second sample "a2" from the top of the overwrite buffer 6 by a mute rate changed by the variation is stored in an (n+2)−th storage area "bn+2" of the output buffer 7. A value obtained by multiplying the sample value of the third sample "a3" from the top of the overwrite buffer 6 by a mute rate changed by the variation is stored in an (n+3)-th storage area "bn+3" of the output buffer 7. Finally, a value obtained by multiplying the sample value of the first sample an from the bottom of the overwrite buffer 6, that is, the sample value of an n-th sample from the top of the overwrite buffer 6, by a mute rate changed by the variation is stored in a 2n-th storage area "bm" of the frame samples of the output buffer 7.

In step S21, the unit 18 for setting the number of frame errors continuously occurring sets a value obtained by adding 1 to the number of frame errors continuously occurring to the new number of frame errors continuously occurring.

In step S22, the output buffer 7 sets a read point P4 to the first storage area "b1", reads out the audio data stored in the storage area "b1", and outputs the read audio data to the PCM output processing unit 8. In the same manner as described above, the output buffer 7 sequentially sets the read pointer P4 to the storage areas "b1" to "bm". Whenever setting the read pointer P4 to the storage areas "b1" to "bm", the output buffer 7 reads out the audio data stored in the storage areas "b1" to "bm" where the read pointer P4 is set.

In step S23, the detecting unit 11 determines whether a normal frame is detected. When the normal frame is detected, an error return process is performed in step S24. The error return process will be described in detail with reference to FIG. 3. After the error return process is performed in step S24, the process returns to step S1. When the normal frame is not detected, the process returns to step S3.

When the process proceeds to step S25, a loop C starts in step S25. In the loop C, the mute setting unit 20 shown in FIG. 1 generates a mute frame. The loop C is composed of step S26 between steps S25 and S27. The number of loops is the number of frame samples.

In step S26, the mute setting unit 20 sets the storage pointer P3 to the first storage area "b1" and stores zero in the storage area "b1". In the same manner, the mute setting unit 20 sequentially sets the storage pointer P3 to the storage areas "b1" to "bm". Whenever setting the storage pointer P3 to the storage areas "b1" to "bm", the mute setting unit 20 stores zero in the storage areas "b1" to "bm" where the storage pointer P3 is set.

Next, an error return process in step S24 will be described in detail. The error return process is performed by the fade-in unit 16 shown in FIG. 1. The number of storage areas of the overwrite buffer 6 corresponds to the number of frame samples, "2n". The overwrite buffer 6 stores the normal frame that is previously detected.

First, in step S31, the mute rate setting unit 45 sets the mute rate that is finally used in the previous stage in step S17 to an initial value of the mute rate.

In step S32, the mute rate setting unit 45 calculates a variation in the mute rate. The variation in the mute rate is calculated by dividing a value obtained by subtracting the initial value of the mute rate from 1 by the number of frame samples.

In step S33, the acquiring pointer setting unit 41 sets the acquiring pointer P2 shown in FIG. 4 to the first sample "a1" of the overwrite buffer 6. In addition, the storage pointer setting unit 42 sets the storage pointer P3 shown in FIG. 5 to the first storage area "b1" of the output buffer 7.

In step S34, a loop D starts. In the loop D, the fade-in unit 16 shown in FIG. 1 generates the next normal frame. The loop D is composed of steps S35 to S38 between step S34 and step S39. The number of loops is the number of frame samples.

In step S35, the acquiring unit 43 acquires, as one sample, the first sample "a1" indicated by the acquiring pointer P2. Then, the acquiring pointer setting unit 41 moves the acquiring pointer P2 in the forward direction by one sample to set the acquiring point P2 to a sample "a2".

In step S36, the adder 46 adds the mute rate to the sample value of the sample "a1".

In step S37, the mute rate setting unit 45 sets a value obtained by adding a variation in the mute rate to the mute rate as a new mute rate.

In step S38, the storage unit 44 stores the value calculated in step S36 in the storage area "b1" of the output buffer 7 where the storage pointer P3 is set. The storage pointer setting unit 42 moves the storage pointer P3 in the forward direction by one area to set the storage pointer P3 to an area "b2".

In step S39, the loop D is completed. Then, the loop D is performed a predetermined number of times in the same manner as described above. In this way, a value obtained by multiplying the sample value of the second sample "a2" of the overwrite buffer 6 by a mute rate changed by the variation is stored in the second storage area "b2" of the output buffer 7. A value obtained by multiplying the sample value of the third sample "a3" of the overwrite buffer 6 by a mute rate changed by the variation is stored in the third storage area "b3" of the output buffer 7. Finally, a value obtained by multiplying the sample value of a 2n-th sample "a2$n$" of the overwrite buffer 6 by a mute rate changed by the variation is stored in a 2n-th storage area "bm" of the frame samples of the output buffer 7.

In step S40, the output buffer 7 sets the read pointer P4 to the first storage area "b1", reads out the audio data stored in the storage area "b1", and outputs the read audio data to the PCM output processing unit 8. In the same manner, the output buffer 7 sequentially sets the read pointer P4 to the storage areas "b1" to "bm". Whenever setting the read pointer P4 to the storage areas "b1" to "bm", the output buffer 7 reads out the audio data stored in the storage areas "b1" to "bm" where the read pointer P4 is set.

Figure 5:
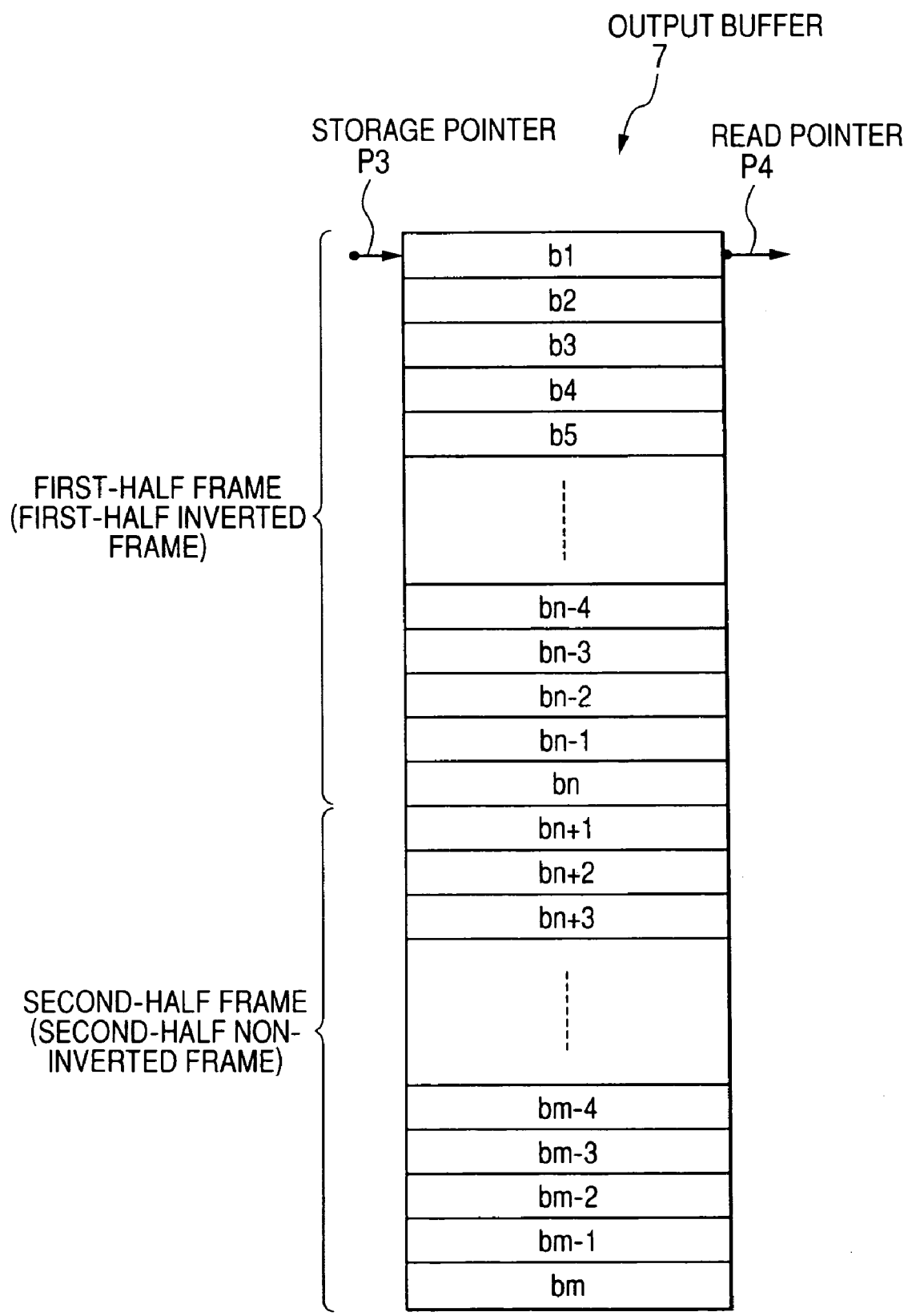
FIG. 5 is a diagram illustrating a configuration of an output buffer.

In step S2 shown in FIG. 2, whenever a frame is input, particularly, when a normal frame is detected, the buffer 5 shown in FIG. 5 may store the samples "a1" to "a2$n$" of the frame in the storage areas "b1" to "bm" of the output buffer 7, respectively. In this way, in the loop D, the overwrite buffer 6 is regarded as the output buffer 7, and the acquiring pointer P2 is regarded as the storage pointer P3, which makes it unnecessary to use the overwrite buffer 6 in the loop D. Therefore, in this embodiment, the overwrite buffer 6 may have the number of storage areas that is half the number of frame samples.

First Example

Figure 6:
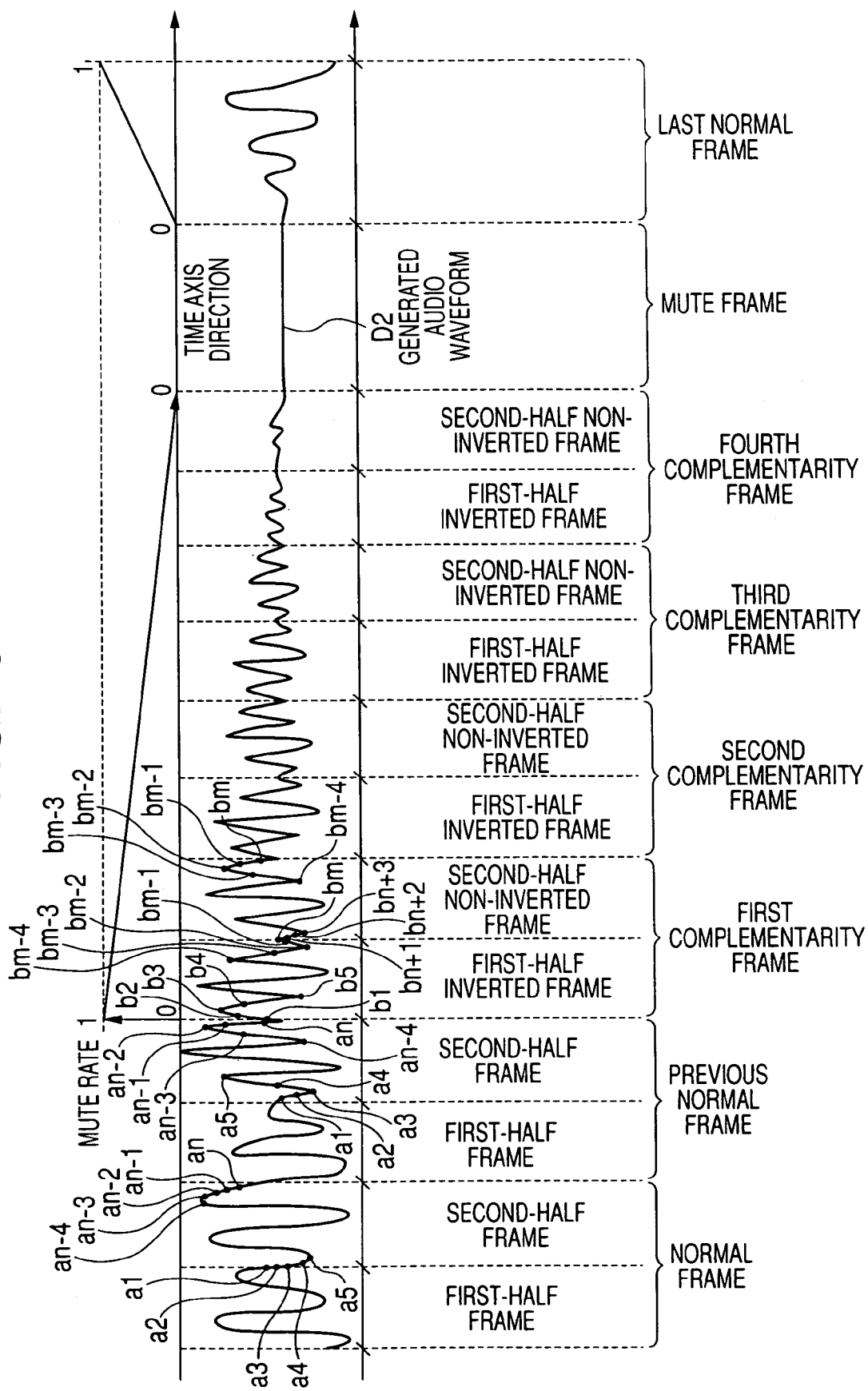
FIG. 6 is a waveform diagram illustrating a sound wave generated by the audio player according to a first example.

As a first example, an audio playing method using the audio player shown in FIG. 1 and the audio playing method shown in FIGS. 2 and 3 will be described below. As shown in FIG. 6, a plurality of normal frames are input to the buffer 5 shown in FIG. 1, and normal frames immediately before defect occurs are referred to as the previous normal frames. The defect causes first to fourth complementarity frames and a mute frame to be generated. The normal frames are detected when the first to fourth complementarity frames and the mute frame are generated, and the normal frames are output from the buffer 5 as the next normal frames.

When the normal frame is input to the buffer 5 shown in FIG. 1, in step S1 shown in FIG. 2, the overwrite buffer 6 stores all samples "a1" to "an" of the second half of the normal frame. The next normal frame is input to the buffer 5. When the previous normal frame is input to the buffer 5, in step S1, the overwrite buffer 6 writes all samples "a1" to "an" of the second half of the previous normal frame over all the samples "a1" to "an" of the second half of the normal frame, and stores the overwritten samples.

In step S2, the detecting unit 11 detects the defect of the frame immediately after the previous normal frame is input.

In step S3, a threshold value for the number of errors is set to 4. An initial value of zero (0) is set to the number of frame errors continuously occurring. It is determined whether the number of frame errors continuously occurring, zero, is larger than the threshold value for the number of errors, that is, 4. Since the number of frame errors continuously occurring is smaller than the threshold value for the number of errors, the process proceeds to step S4, and the first complementarity frame is generated.

In step S4, it is determined whether the number of frame errors continuously occurring is zero. Since the number of frame errors continuously occurring is zero, the process proceeds to step S6, and the mute rate is set to 1 in step S6.

In step S7, a variation in the mute rate is calculated. The variation in the mute rate is obtained by dividing the initial value, 1, of the mute rate by a product of the threshold value, 4, for the number of errors and the number of frame samples, "2n".

In step S8, the acquiring pointer P2 shown in FIG. 4 is set to the last sample "an" of the overwrite buffer 6. In addition, the storage pointer P3 shown in FIG. 5 is set to the first storage area "b1" of the output buffer 7.

In step S9, the loop A starts. In the loop A, the first-half inverted frame of the first complementarity frame is generated.

In step S10, one sample an indicated by the acquiring pointer P2 is acquired, and the acquiring pointer P2 moves in the reverse direction by one sample to be set to a sample "an−1".

In step S11, the mute rate having a value of 1 is multiplied by the sample value of the sample "an".

In step S12, a value obtained by subtracting a variation in the mute rate from the mute rate, 1, is set to a new mute rate. When the mute rate varies in this way, the mute rate for each of the storage areas "b1" to "bm" is reduced by the variation, and the mute rate corresponding to the last storage area "bm" of the fourth complementarity frame of the complementarity frames whose number is equal to the threshold value, 4, for the number of errors is zero, or is equal to the variation, as shown in FIG. 6.

In step S13, the value obtained in step S11 is stored in the storage area "b1" of the output buffer 7 where the storage pointer P3 is set. The storage pointer P3 moves in the forward direction by one area to be set to a storage area "b2".

The loop A is performed a predetermined number of times in the same manner as described above. In this way, a value obtained by multiplying the sample value of the second sample "an−1" from the bottom of the overwrite buffer 6 by a mute rate changed by the variation is stored in the second storage area "b2" of the output buffer 7. Finally, a value obtained by multiplying the sample value of the first sample a1 from the top of the overwrite buffer 6, that is, the sample value of an n-th sample from the bottom of the overwrite buffer 6, by a mute rate changed by the variation is stored in an n-th storage area "bn" of half the frame samples of the frame of the output buffer 7. Since the mute rate is gradually reduced in the first-half inverted frame of the first complementarity frame, the sample value is also gradually reduced. The audio waveform D2 of the first-half inverted frame of the first complementarity frame and the audio waveform D2 of the second-half frame of the previous normal frame are symmetric with respect to the vertical axis. Therefore, the audio waveform D2 of the first-half inverted frame of the first complementarity frame is continuous with the audio waveform D2 of the second-half frame of the previous normal frame.

In step S15, the loop B starts. In the loop B, the second-half non-inverted frame of the first complementarity frame is generated.

In step S16, the first sample a1 from the top, which is indicated by the acquiring pointer P2 shown in FIG. 4, is acquired, and the acquiring pointer P2 moves in the forward direction by one sample to be set to a sample "a2".

In step S17, the mute rate is multiplied by the sample value of the sample "a1".

In step S18, a value obtained by subtracting a variation in the mute rate from the mute rate is set to a new mute rate. The mute rate is continuously reduced in the second-half non-inverted frame.

In step S19, the value obtained in step S17 is stored in a storage area "bn+1" of the output buffer 7 where the storage pointer P3 is set. The storage pointer P3 moves in the forward direction by one area to be set to a storage area "bn+2".

The loop B is performed a predetermined number of times in the same manner as described above. In this way, a value obtained by multiplying the sample value of the second sample "a2" from the top of the overwrite buffer 6 by a mute rate changed by the variation is stored in a (n+2)-th storage area bn+2 of the output buffer 7. Finally, a value obtained by multiplying the sample value of the first sample "an" from the bottom of the overwrite buffer 6, that is, the sample value of an n-th sample from the top of the overwrite buffer 6, by a mute rate changed by the variation is stored in an 2n-th storage area "bm" of the frame samples of the frame of the output buffer 7. Since the mute rate is gradually reduced in the second-half non-inverted frame of the first complementarity frame, the sample value is also gradually reduced. The audio waveform D2 of the second-half non-inverted frame of the first complementarity frame is the same as the audio waveform D2 of the second-half frame of the previous normal frame. Also, the audio waveform D2 of the second-half non-inverted frame of the first complementarity frame and the audio waveform D2 of the first-half inverted frame of the first complementarity frame are symmetric with respect to the vertical axis. Therefore, the audio waveform D2 of the second-half non-inverted frame of the first complementarity frame is continuous with the audio waveform D2 of the first-half inverted frame of the first complementarity frame in the previous stage.

In step S21, a value, 1, obtained by adding 1 to the number of frame errors continuously occurring, zero, is set to the new number of frame errors continuously occurring.

In step S22, the audio data D2 of the first complementarity frame is read. The audio data D2 of the first complementarity frame 1 is gradually reduced, and it is continuous with audio data of the previous normal frame. As a result, occurrence of noise is prevented.

In step S23, it is determined whether a normal frame is detected after the defect of a frame is detected. Since the normal frame is not detected, the process returns to step S3.

Next, steps S3 to S23 are performed again to generate the second complementarity frame. Similar to the first complementarity frame, the second complementarity frame includes a first-half inverted frame and a second-half non-inverted frame. Since the mute rate is gradually reduced in the first-half inverted frame of the second complementarity frame, the sample value is also gradually reduced. The audio waveform D2 of the first-half inverted frame of the second complementarity frame and the audio waveform D2 of the second-half frame of the previous normal frame are symmetric with respect to the vertical axis. Also, the audio waveform D2 of the first-half inverted frame of the second complementarity frame and the audio waveform D2 of the second-half non-inverted frame of the first complementarity frame are symmetric with respect to the vertical axis. Therefore, the audio waveform D2 of the first-half inverted frame of the second complementarity frame is continuous with the audio waveform D2 of the second-half non-inverted frame of the first complementarity frame in the previous stage. Since the mute rate is gradually reduced in the second-half non-inverted frame of the second complementarity frame, the sample value is also gradually reduced. The audio waveform D2 of the second-half non-inverted frame of the second complementarity frame is the same as the audio waveform D2 of the second-half frame of the previous normal frame. Also, the audio waveform D2 of the second-half non-inverted frame of the second complementarity frame and the audio waveform D2 of the first-half inverted frame of the second complementarity frame are symmetric with respect to the vertical axis. Therefore, the audio waveform D2 of the second-half non-inverted frame of the second complementarity frame is continuous with the audio waveform D2 of the first-half inverted frame of the second complementarity frame in the previous stage. Since the normal frame is not detected in step S23, the process returns to step S3 again.

Then, steps S3 to S23 are performed to generate the third complementarity frame. Similarly, the third complementarity frame includes a first-half inverted frame and a second-half non-inverted frame. The audio waveform D2 of the first-half inverted frame of the third complementarity frame is continuous with the audio waveform D2 of the second-half non-inverted frame of the second complementarity frame in the previous stage. The audio waveform D2 of the second-half non-inverted frame of the third complementarity frame is continuous with the audio waveform D2 of the first-half inverted frame of the third complementarity frame. Since the normal frame is not detected in step S23, the process returns to step S3 again.

Subsequently, steps S3 to S23 are performed to generate the fourth complementarity frame. Similarly, the fourth complementarity frame includes a first-half inverted frame and a second-half non-inverted frame. The audio waveform D2 of the first-half inverted frame of the fourth complementarity frame is continuous with the audio waveform D2 of the second-half non-inverted frame of the third complementarity frame in the previous stage. The audio waveform D2 of the second-half non-inverted frame of the fourth complementarity frame is continuous with the audio waveform D2 of the first-half inverted frame of the fourth complementarity frame. The intensity of the audio data D2 of the second-half non-inverted frame of the fourth complementarity frame is reduced to zero in the end. Since the normal frame is not detected in step S23, the process returns to step S3 again.

In step S3, five frame errors continuously occur up to this stage, and thus it is determined that the number of frame errors, 5, continuously occurring is larger than the threshold value, 4, for the number of errors. Therefore, the process proceeds to step S25.

In step S25, the storage pointer P3 shown in FIG. 5 is set to the first storage area "b1", and a value of zero is stored in the storage area "b1". In the same manner as described above, the storage pointer P3 is sequentially set to the storage areas "b1" to "bm". Whenever the storage pointer P2 is sequentially to the storage areas "b1" to "bm", a value of zero is stored in the storage areas "b1" to "bm" where the storage pointer P3 is set. In this way, the mute frame shown in FIG. 6 is generated. Then, the process proceeds to step S23.

In step S23, it is determined whether a normal frame is detected after the defect of a frame is detected. As shown in FIG. 6, since the normal frame is detected, the process proceeds to step S24 and also proceeds to step S31 shown in FIG. 3.

In step S31, the mute rate having a value of zero that is finally used in step S17 is set as an initial value of the mute rate.

In step S32, a variation in the mute rate is calculated. The variation in the mute rate is calculated by dividing a value obtained by subtracting the initial value, zero, of the mute rate from a final value of 1, which is the maximum value of the mute rate, by the number of frame samples.

In step S33, the acquiring pointer P4 shown in FIG. 4 is set to the first sample a1 of the overwrite buffer 6. In addition, the storage pointer setting unit 42 sets the storage pointer P3 shown in FIG. 5 to the first storage area "b1" of the output buffer 7.

In step S35, one sample "a1" indicated by the acquiring pointer P2 is acquired, and the acquiring pointer P2 moves in the forward direction by one sample to be set to a sample "a2".

In step S36, the mute rate having a value of 1 is multiplied by the sample value of the sample "a1".

In step S37, a value obtained by adding a variation in the mute rate to the mute rate is set to a new mute rate. When the mute rate varies in this way, as shown in FIG. 6, the mute rate for each of the storage areas "b1" to "bm" is reduced by the variation, and the mute rate corresponding to the last storage area "bm" of the next normal frame becomes the final value of 1, which is the maximum value of the mute rate.

In step S38, the value obtained in step S36 is stored in the storage area "b1" of the output buffer 7 where the storage pointer P3 is set. The storage pointer P3 moves in the forward direction by one storage area to be set to a storage area "b2".

Similarly, a value obtained by multiplying the sample value of the second sample "a2" of the overwrite buffer 6 by a mute rate changed by the variation is stored in the second storage area "b2" of the output buffer 7. Finally, a value obtained by multiplying the sample value of a 2n-th sample "a2n" of the overwrite buffer 6 by a mute rate changed by the variation is stored in a 2n-th storage area "bm" of the frame samples of the output buffer 7.

In step S40, whenever the read pointer P4 is set to the storage areas "b1" to "bm", the audio data D2 stored in the storage areas "b1" to "bm" where the read pointer P4 is set is read out. In this way, the next normal frame is generated as shown in FIG. 6. Since the mute rate gradually increases from zero to 1 in the next normal frame, the sample value also gradually increases from zero up to a value not concerned with the mute rate. Therefore, the audio waveform D2 of the next normal frame is continuous with the audio waveform D2 of the mute frame. The error return process of step S24 shown in FIG. 2 is completed, and the process returns to step S1.

As shown in FIG. 6, when the defect of a frame is detected, the audio waveform D2 fades out to a mute waveform. In addition, when a normal frame is detected, the audio waveform D2 fades in from the mute waveform. The audio waveform D2 is continuous from the fade-out to the fade-in. The audio player for decoding the compressed digital audio stream according to the first example can generate output PCM data which has a smaller computing amount, as compared with a structure in which, for example, a filter is used, and whose audio quality does not deteriorate due to the discontinuity of the audio waveform D2, when abnormal compressed audio data is input.

Second Example

Figure 7:
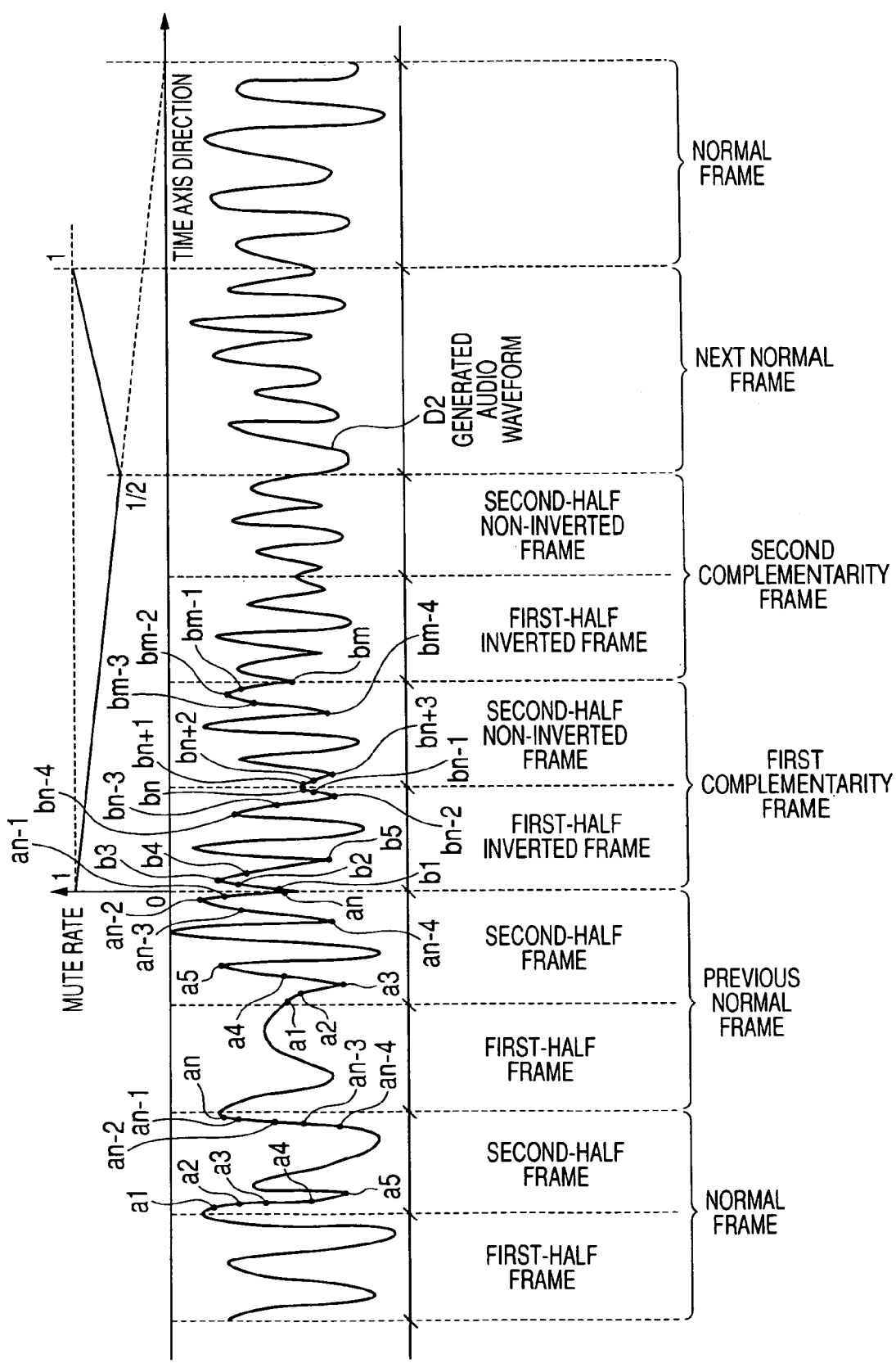
FIG. 7 is a waveform diagram illustrating a sound wave generated by the audio player according to a second example.

As a second example, an audio playing method using the audio player shown in FIG. 1 and the audio playing method shown in FIGS. 2 and 3 will be described below. As shown in FIG. 7, a plurality of normal frames are input to the buffer 5 shown in FIG. 1, and normal frames immediately before defect occurs are referred to as previous normal frames. The defect causes first and second complementarity frames to be generated. The normal frames are detected after the first and second complementarity frames are generated, and the normal frames are output from the buffer 5 as the next normal frames. In this way, the normal frames are input or output to or from the buffer 5.

When the normal frame is input to the buffer 5 shown in FIG. 1, in step S1 shown in FIG. 2, the overwrite buffer 6 stores all samples "a1" to "an" of the second half of the normal frame. When the previous normal frame is input to the buffer 5, in step S1, the overwrite buffer 6 writes all samples "a1" to "an" of the second half of the previous normal frame over all the samples "a1" to "an" of the second half of the normal frame, and stores the overwritten samples.

In step S2, the defect of the frame is detected immediately after the previous normal frame is input.

In step S3, a threshold value for the number of errors is set to 4. An initial value of zero (0) is set to the number of frame errors continuously occurring. It is determined whether the number of frame errors continuously occurring, zero, is larger than the threshold value for the number of errors, that is, 4. Since the number of frame errors continuously occurring is smaller than the threshold value for the number of errors, the process proceeds to step S4, and the first complementarity frame is generated.

In step S4, it is determined whether the number of frame errors continuously occurring is zero. Since the number of frame errors continuously occurring is zero, the process proceeds to step S6, and the mute rate is set to 1 in step S6.

In step S7, a variation in the mute rate is calculated. The variation in the mute rate is obtained by dividing the initial value, 1, of the mute rate by a product of the threshold value, 4, for the number of errors and the number of frame samples, "2n".

In step S8, the acquiring pointer P2 shown in FIG. 4 is set to the last sample "an" of the overwrite buffer 6. In addition, the storage pointer P3 shown in FIG. 5 is set to the first storage area "b1" of the output buffer 7.

In step S9, a loop A starts. In the loop A, a first-half inverted frame of the first complementarity frame is generated.

In step S10, one sample an indicated by the acquiring pointer P2 is acquired, and the acquiring pointer P2 moves in the reverse direction by one sample to be set to a sample "an−1".

In step S11, a mute rate having a value of 1 is multiplied by the sample value of the sample "an".

In step S12, a value obtained by subtracting a variation in the mute rate from the mute rate, 1, is set to a new mute rate. When the mute rate varies in this way, as shown in FIG. 7, the mute rate for each of the storage areas "b1" to "bm" is reduced by the variation, and the mute rate corresponding to the last storage area "bm" of the second complementarity frame of the complementarity frames whose number is half the threshold value, 4, for the number of errors is zero, or is equal to the variation. Therefore, the mute rate corresponding to the last storage area "bm" of the second frame 2 whose number is half the threshold value, 4, for the number of errors is ½.

In step S13, the value obtained in step S11 is stored in the storage area "b1" of the output buffer 7 where the storage pointer P3 is set. The storage pointer P3 moves in the forward direction by one area to be set to a storage area "b2".

The loop A is performed a predetermined number of times in the same manner as described above. In this way, a value obtained by multiplying the sample value of the second sample "an−1" from the bottom of the overwrite buffer 6 by a mute rate changed by the variation is stored in the second storage area "b2" of the output buffer 7. Finally, a value obtained by multiplying the sample value of the first sample "a1" from the top of the overwrite buffer 6, that is, the sample value of an n-th sample from the bottom of the overwrite buffer 6, by a mute rate changed by the variation is stored in an n-th storage area "bn" of half the frame samples of the frame of the output buffer 7. Since the mute rate is gradually reduced in the first-half inverted frame of the first complementarity frame, the sample value is also gradually reduced. The audio waveform D2 of the first-half inverted frame of the first complementarity frame and the audio waveform D2 of the second-half frame of the previous normal frame are symmetric with respect to the vertical axis. Therefore, the audio waveform D2 of the first-half inverted frame of the first complementarity frame is continuous with the audio waveform D2 of the second-half frame of the previous normal frame.

In step S15, a loop B starts. In the loop B, the second-half non-inverted frame of the first complementarity frame is generated.

In step S16, the first sample "a1" from the top, which is indicated by the acquiring pointer P2 shown in FIG. 4, is acquired, and the acquiring pointer P2 moves in the forward direction by one sample to be set to a sample "a2".

In step S17, the sample value of the sample "a1" is multiplied by the mute rate.

In step S18, a value obtained by subtracting a variation in the mute rate from the mute rate is set to a new mute rate. The mute rate is continuously reduced in the second-half non-inverted frame.

In step S19, the value calculated in step S17 is stored in a storage area "bn+1" of the output buffer 7 where the storage pointer P3 is set. The storage pointer P3 moves in the forward direction by one area to be set to a storage area "bn+2".

The loop B is performed a predetermined number of times in the same manner as described above. In this way, a value obtained by multiplying the sample value of the second sample "a2" from the top of the overwrite buffer 6 by a mute rate changed by the variation is stored in an (n+2)-th storage area bn+2 of the output buffer 7. Finally, a value obtained by multiplying the sample value of the first sample an from the bottom of the overwrite buffer 6, that is, the sample value of an n-th sample from the top of the overwrite buffer 6, by a mute rate changed by the variation is stored in a 2n-th storage area "bm" of the frame samples of the frame of the output buffer 7. Since the mute rate is gradually reduced in the second-half non-inverted frame of the first complementarity frame, the sample value is also gradually reduced. The audio waveform D2 of the second-half non-inverted frame of the first complementarity frame is the same as the audio waveform D2 of the second-half frame of the previous normal frame. In addition, the audio waveform D2 of the second-half non-inverted frame of the first complementarity frame and the audio waveform D2 of the first-half inverted frame of the first complementarity frame are symmetric with respect to the vertical axis. Therefore, the audio waveform D2 of the second-half non-inverted frame of the first complementarity frame is continuous with the audio waveform D2 of the first-half inverted frame of the first complementarity frame.

In step S21, a value, 1, obtained by adding 1 to the number of frame errors continuously occurring, zero, is set to the new number of frame errors continuously occurring.

In step S22, the audio data D2 of the first complementarity frame is read out. The audio data D2 of the first complementarity frame 1 is gradually reduced, and it is continuous with audio data of the previous normal frame. As a result, occurrence of noise is prevented.

In step S23, it is determined whether a normal frame is detected after the defect of a frame is detected. Since the normal frame is not detected, the process returns to step S3.

Next, steps S3 to S23 are performed to generate the second complementarity frame. Similar to the first complementarity frame, the second complementarity frame includes a first-half inverted frame and a second-half non-inverted frame. Since the mute rate is gradually reduced in the first-half inverted frame of the second complementarity frame, the sample value is also gradually reduced. The audio waveform D2 of the first-half inverted frame of the second complementarity frame and the audio waveform D2 of the second-half frame of the previous normal frame are symmetric with respect to the vertical axis. Also, the audio waveform D2 of the first-half inverted frame of the second complementarity frame and the audio waveform D2 of the second-half non-inverted frame of the first complementarity frame are symmetric with respect to the vertical axis. Therefore, the audio waveform D2 of the first-half inverted frame of the second complementarity frame is continuous with the audio waveform D2 of the second-half non-inverted frame of the first complementarity frame in the previous stage. Since the mute rate is gradually reduced in the second-half non-inverted frame of the second complementarity frame, the sample value is also gradually reduced. The audio waveform D2 of the second-half non-inverted frame of the second complementarity frame is the same as the audio waveform D2 of the second-half frame of the previous normal frame. Also, the audio waveform D2 of the second-half non-inverted frame of the second complementarity frame and the audio waveform D2 of the first-half inverted frame of the second complementarity frame are symmetric with respect to the vertical axis. Therefore, the audio waveform D2 of the second-half non-inverted frame of the second complementarity frame is continuous with the audio waveform D2 of the first-half inverted frame of the second complementarity frame. In step S23, it is determined whether a normal frame is detected after the defect of a frame is detected. As shown in FIG. 7, since the normal frame is detected, the process proceeds to step S24 and also proceeds to step S31 shown in FIG. 3. The values of the frame samples of the normal frame are stored in the storage areas b1 to bm of the output buffer 7 before and after step S31.

In step S31, half the mute rate that is finally used in step S17 is set as an initial value of the mute rate.

In step S32, a variation in the mute rate is calculated. The variation in the mute rate is calculated by dividing a value obtained by subtracting half the initial value of the mute rate from a final value of 1, which is the maximum value of the mute rate, by the number of frame samples.

In step S33, the acquiring pointer P4 shown in FIG. 4 is set to the first storage area b1 of the output buffer 7 shown in FIG. 5. In addition, the storage pointer P3 shown in FIG. 5 is set to the first storage area "b1" of the output buffer 7.

In step S35, the sample value of the storage area "b1" indicated by the acquiring pointer P2 is acquired, and the acquiring pointer P2 moves in the forward direction by one sample to be set to a storage area "b2".

In step S36, the sample value of the acquired storage area "b1" is multiplied by half the mute rate.

In step S37, a value obtained by adding a variation in the mute rate to the mute rate is set to a new mute rate. When the mute rate varies in this way, as shown in FIG. 7, the mute rate for each of the storage areas "b1" to "bm" is reduced by the variation, and the mute rate corresponding to the last storage area "bm" of the next normal frame becomes the final value of 1, which is the maximum value of the mute rate.

In step S38, the value obtained in step S36 is stored in the storage area "b1" of the output buffer 7 where the storage pointer P3 is set. The storage pointer P3 moves in the forward direction by one storage area to be set to the storage area "b2".

Similarly, a value obtained by multiplying the sample value of the second sample "a2" of the overwrite buffer 6 by a mute rate changed by the variation is stored in the second storage area "b2" of the output buffer 7. Finally, a value obtained by multiplying the sample value of a 2n-th sample "a2n" of the overwrite buffer 6 by a mute rate changed by the variation is stored in a 2n-th storage area "bm" of the frame samples of the output buffer 7.

In step S40, whenever the read pointer P4 is set to the storage areas "b1" to "bm", the audio data D2 stored in the storage areas "b1" to "bm" where the read pointer P4 is set is read out. In this way, step S24 shown in FIG. 2 is completed, and the process proceeds to step S1. In step S1, the overwriting of the normal frame is performed.

The next frame is generated in succession to the previous normal frame, but it may be delayed due to any cause. In this case, when the next frame is arranged next to the previous normal frame, the audio waveform D2 of the next frame is continuous with the audio waveform D2 of the previous normal frame. Since the waveform D2 of the second-half non-inverted frame of the second complementarity frame before the next frame is the same as the audio waveform D2 of the second-half frame of the previous normal frame, the audio waveform D2 of the next frame is continuous with the audio waveform D2 of the second-half non-inverted frame of the second complementarity frame. This continuity can be established even though the mute rate is added. As shown in FIG. 7, this is because the mute rate added to the last sample value of the next frame is equal to the mute rate added to the last sample value of the second-half non-inverted frame of the second complementarity frame. Since the mute rate gradually increases from ½ to 1 in the next frame, the sample value also gradually increases from ½ to a value not concerned with the mute rate. Therefore, the audio waveform D2 of the next normal frame is continuous with the audio waveform D2 of the second complementarity frame. The audio waveform D2 of the next frame is continuous with the audio waveform D2 of the normal frame after the next frame. The error return process of step S24 shown in FIG. 2 is completed, and the process returns to step S1.

As shown in FIG. 7, when the defect of a frame is detected, the audio waveform D2 fades out. When a normal frame is detected, the audio waveform D2 fades in. The audio waveform D2 is continuous from the fade-out to the fade-in. The audio player for decoding the compressed digital audio stream according to the second example can generate output PCM data which has a smaller computing amount, as compared with a structure in which, for example, a filter is used, and whose audio quality does not deteriorate due to the discontinuity of the audio waveform D2, when abnormal compressed audio data is input.

Third Example

As a third example, an output buffer replaceable with the overwrite buffer 6 and the output buffer 7 according to the first and second examples will be described below.

Figure 8:
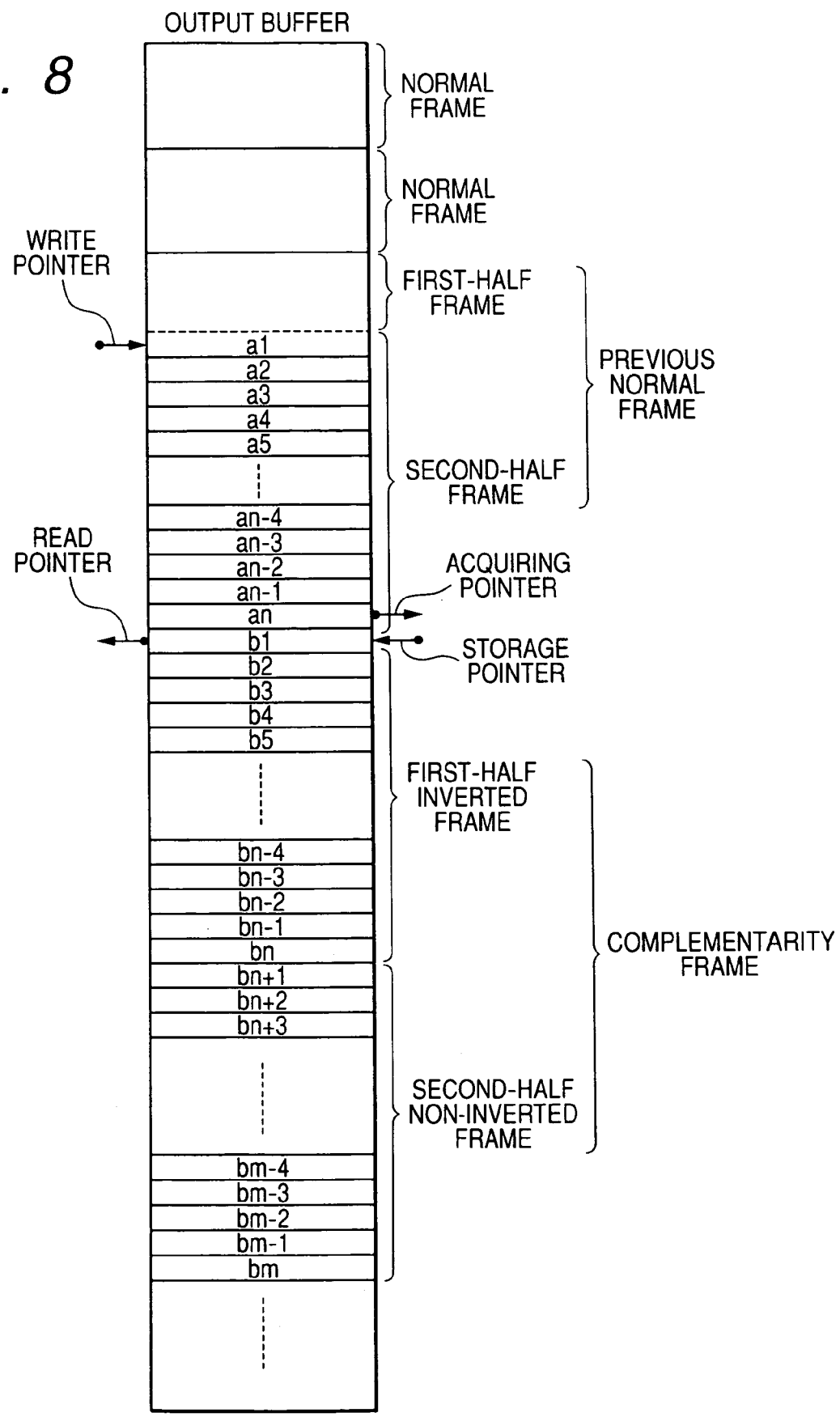
FIG. 8 is a diagram illustrating a configuration of an output buffer of an audio player according to a third example.

As shown in FIG. 8, the output buffer includes a write pointer, a read pointer, an acquiring pointer, and a storage pointer.

The output buffer sequentially stores sample values of a plurality of generated normal frames by using a write pointer. Similar to the normal frames, sample values of a previous normal frame are also sequentially stored after the sample values of the normal frames. In particular, sample values "a1" to "an" of the second-half frame of the previous normal frame are stored as shown in FIG. 8. Storage areas having the sample values "a1" to "an" stored therein correspond to the overwrite buffer 6 of the first and second examples. That is, it is considered that the overwrite buffer 6 is generated in the output buffer and the output buffer has the overwrite buffer 6. Which storage area of the output buffer the overwrite buffer 6 is generated in depends on a period for which the defect of a frame is detected.

The storage area of the sample value of the complementarity frame is ensured in the storage areas "b1" to "bm" below the sample value "an". A first-half inverted frame and a second-half non-inverted frame are generated. In the generation of the first-half inverted frame, first, an acquiring pointer is set to a storage area where the sample value "an" is stored, and a storage pointer is set to the storage area "b1". In this way, the first-half inverted frame can be generated in the same manner as that in the first example. In the generation of the second-half non-inverted frame, first, the acquiring pointer is set to a storage area where the sample value "a1" is stored, and the storage pointer is set to a storage area "bn+1". In this way, the second-half non-inverted frame can be generated in the same manner as that in the first example.

When a normal frame is detected after the defect of a frame is detected, a write pointer is set to a storage area right under the complementarity frame or a mute frame, and the sample values of the normal frame detected after defect are sequentially stored from the top by using the write pointer. After the storing of the sample values, fade-in is performed in the same manner as that in the first example.

A read pointer is used to read out the sample values from the output buffer for outputting audio waveforms. The read pointer sequentially moves down from the uppermost storage area of the output buffer. Whenever the read pointer moves down, the sample value of the storage area where the read pointer is set is read out.

The use of the output buffer according to the third example makes it unnecessary to provide a separate overwrite buffer 6.

As described above with reference to the embodiment and the examples, there is provided an audio player capable of preventing the deterioration of sound quality and an increase in the amount of computing data, and complementing omitted frames.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. An audio player comprising:
   a buffer unit that temporary stores sampling values contained in a second-half frame of each of a plurality of frames received in time series, the frames containing audio data sampled in a predetermined sampling rate;
   a detecting unit that detects a defect in the frames;
   an inverted-frame generating unit that generates a first-half inverted frame containing first-half complementarity samples that are obtained by arranging the sampling values of the second-half frame of a normal frame in a reverse order of the time series, the normal frame being received immediately before the defect is detected by the detecting unit;
   a non-inverted frame generating unit that generates a second-half non-inverted frame containing second-half complementarity samples that are obtained by arranging the sampling values of the second-half frame of the normal frame in the time series; and
   an output unit that outputs the normal frame, the first-half inverted frame, and the second-half non-inverted frame, in this order.

2. The audio player according to claim 1, wherein the buffer unit comprises an overwrite buffer that repeatedly overwrites and stores the sampling values, in time series, contained in the second-half frame of each of the frames.

3. The audio player according to claim 1, further comprising a fade-out unit that controls the sampling values of the first-half complementarity samples and of the second-half complementarity samples to fade out an output level of the audio data.

4. The audio player according to claim 1, wherein the detecting unit detects a dissolution of the defect when the frames start to be received again, and
   wherein, when the detecting unit detects the dissolution of the defect, the output unit outputs, next to the second-half non-inverted frame, the normal frame received immediately after the dissolution of the defect.

5. The audio player according to claim 4, further comprising a fade-in unit that controls the sampling values of samples contained in the normal frame to fade in an output level of the audio data.

6. The audio player according to claim 1, wherein the output unit outputs a frame containing samples for muting an output level of the audio data, after repeatedly performing an alternate output of the first-half inverted frame and the second-half non-inverted frame.

* * * * *